Oct. 26, 1965 D. R. SPENCER ETAL 3,214,733

DATA MULTIPLEXING APPARATUS

Filed Dec. 23, 1960

INVENTORS
DANA R. SPENCER
PHILIP P. CARTIER

BY Harry T. Berriman
AGENT

United States Patent Office 3,214,733
Patented Oct. 26, 1965

3,214,733

DATA MULTIPLEXING APPARATUS

Dana R. Spencer, Wappingers Falls, and Philip P. Cartier, Poughkeepsie, N.Y., assignors to International Business Machines Corporation, New York, N.Y., a corporation of New York Filed Dec. 23, 1960, Ser. No. 78,143
5 Claims. (Cl. 340—147)

Figure 1:
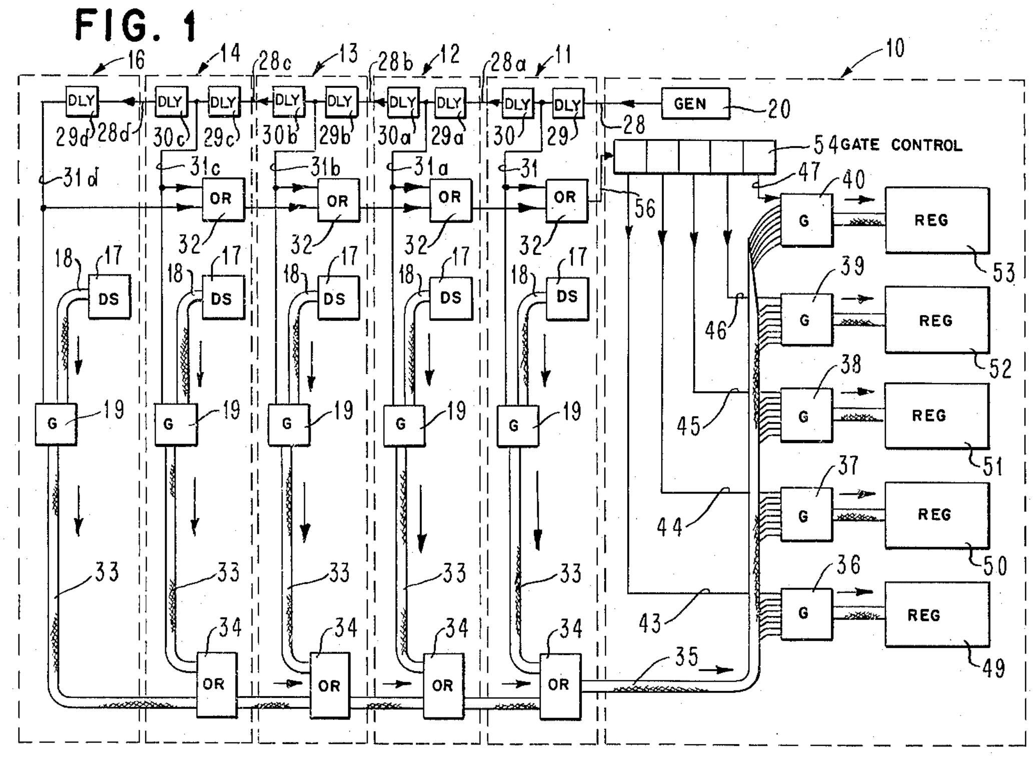

This invention relates to time division multiplex data transmission apparatus and more particularly to improved circuitry for effecting time division multiplexing of data signals from a plurality of remote data source terminals onto a single data line and subsequently separating the data out at a destination as required.

In any time division multiplex signalling system wherein data messages from a plurality of remote sending stations are transmitted on a time differential manner over a common line with each data message then being sorted out for routing to a particular related data slot or register at a central destination, the major difficulty is to maintain the data sorting apparatus in proper synchronism with each transmitted message so that a message is not routed to the wrong destination. This problem is sometimes referred to as the "skew" problem and is of course aggravated by the fact that since the transmitting terminals are different distances from the receiving station each message has its own finite transit time over the common data line. A common approach to handling the skew problem is to have the central station send out a transmit start pulse addressed to a particular station to initiate a data transmission, the central assuming that the data appearing on the incoming common line after a certain delay for that station is the data from that station. This arrangement has the disadvantage in that each time a new terminal is added to the system, the central clocking equipment must be reworked to set up new addressing codes and also take into account the particular transit time for a message to be received from the new terminal. This usually requires a major rework of the central equipment. Another disadvantage is that any type of external signal transient that might change the normal message transit time from a terminal, could cause all or part of the message to be routed to an improper destination.

These difficulties as to skew, and system growth are eliminated in the subject invention in the following manner. The central station generates time-spaced data sample pulses which are applied to a single so-called data sample line. The sample line extends from the central station to each of the remote sending stations or transmitting terminals. Delay circuits are provided in the sample line between each terminal so that each terminal is sampled for data in a serial timed fashion. If data is present the terminal dumps it onto a common data line leading to the central. Each data sample pulse in reading out a terminal is also applied over a common sync line leading back to the central. The data from a terminal and its associated timed sync pulse are utilized to operate selection or routing circuitry to route the data from each terminal to its proper destination. Since each initial sample pulse generated at the central is used for both timed readout of each terminal and also retransmitted as a sync pulse back to the central in synchronism with the readout data, there is no possibility of data being out of skew with its associated sync pulse which is used to effect the data sorting out operation. This sorting is effected by using the pulses in the sync line to decode the multiplexed data on the common data in accordance with time to thus route the data from each transmitter to its proper receiver. The system is readily expandable, when additional sending terminals are required.

It is accordingly an object of the invention to provide an improved system for effecting time division multiplexing of data over a single data line or bus.

It is another object to provide an improved time division data multiplexing system wherein the sampling and transmission of data from various data source terminals over a common data line to a central terminal is effected by a data sample pulse traveling down a delay line to each terminal in turn, the same sampling pulse being also applied from each terminal as a sync pulse via a single synchronization line back to the central to control the decoding or selection of the data on the common data line.

It is another object to provide improved apparatus for effecting time division transmission of data from remote sending terminals over a single common data line to a central terminal wherein the incoming data to the central terminal may be decoded and routed to proper destinations by synchronizing apparatus accurately timed to each sending terminal.

It is another object to provide an improved time division multiplex data transmission system which eliminates synchronization problems on the decoding of the data at a receiving central.

It is a still further object to provide an improved time division multiplex data transmission system for handling multiple remote and separated sending terminals and wherein the system is readily expandable without major system rework.

The foregoing and other objects, features and advantages of the invention will be apparent from the following more particular description of a preferred embodiment of the invention, as illustrated in the accompanying drawings.

In the drawings:

FIG. 1 is a schematic circuit diagram of the improved time division multiplex data transmission system.

FIGS. 2*a* through 2*g* are waveform charts of the various electrical pulses distributed in the system during cycles of operation thereof.

Referring now to FIG. 1, the improved system comprises a central terminal or station generally designated 10 and enclosed with the broken line enclosure is indicated. There are also provided a number of remote serially arranged transmitting terminals or stations 11, 12, 13, 14 and 16, which are spaced from the central terminal by various distances as required by the areas to be serviced thereby. Each remote terminal includes a data source device represented by block 17 which generates data characters serially, each data character having 7 parallel elements or bits. Thus if a terminal source device 17 has a character ready to transmit, 7 bits or elements are presented over a related seven line data cable 18 to a related gating circuit 19 for that terminal.

Figure 2:
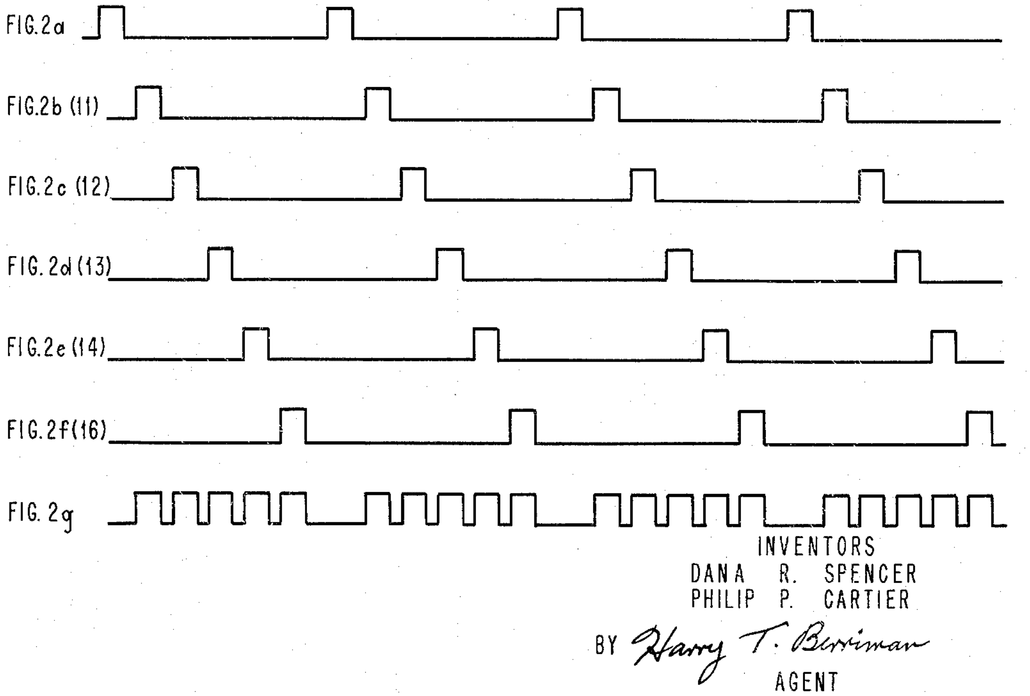

Referring now to the central terminal 10, it includes a pulse generator 20 which when the system is in operation, continually generates a series of spaced pulses as indicated in the waveform of FIG. 2*a*. The signal output of pulse generator 20 is applied therefrom over a conductor 28 to the terminal 11. The pulses on conductor 28 pass successively through serially connected signal delay elements 29 and 30 in terminal 11 and then continue through conductor **28*a* to terminal 12. Here again the pulses on conductor 28*a* pass successively through serially connected delay elements 29*a*, and 30*a* in terminal 12. The pulses continue in the same fashion from delay element 30*a*, through conductor 28*b*, delay elements 29*b* and 30*b* of terminal 13, conductor 28*c*, delay elements 29*c* and 30*c* of terminal 14, and conductor 28*d* to delay element 29*d* of terminal 16. The common junction of the delay elements 29 and 30 of terminal 11 is connected through a conductor 31 to one input of an OR circuit 32 and also to another input of gating circuit 19** of that terminal.

Similarly, the junction of each of the pairs of delay units 29a–30a of terminal 12, the units 29b–30b of terminal 13, the units 29c–30c of terminal 14 and unit 29d of terminal 16 is each connected through a conductor 31a, b, c and d respectively to its associated gating circuit 19 as shown. It will be recalled that the data from each terminal data source device is also applied to the related gating circuit 19.

By the above described circuitry each pulse from the generator 20 is delayed in element 29 of terminal 11 and then applied through conductor 31 to the control input of the related gating circuit 19. If at this time data information is present in cable 18, the circuit 19 is actuated and the data is gated therethrough to associated output data cable 33. This same pulse from generator 20 continues through delay unit 30 to delay unit 29a of terminal 12 and the conductor 31a to gate out any data from its associated data source unit 17 to the related output cable 33 of terminal 12. In the same manner, each pulse from generator 20 continues in turn to each of the remaining remote terminals 13, 14 and 15. Thus each output pulse from generator 20 is effective to read out in time succession any data from each related terminal data source to its related output cable 33. The manner in which each pulse from generator 20 is delayed in turn to effect readout of each terminal data at a particular time is evident from the waveform of FIGS. 2*b, c, d, e,* and *f* which represent the time at which each pulse from generator 20 as represented by FIG. 2*a*, is delayed to readout the terminals 11, 12, 13, 14 and 16, respectively. The conductor 28 and its associated terminal associated delay units 29, 30 etc., may be referred to by the term data sample line since by its action under control of generator 20, the data source unit 17 at each terminal is sampled. The delay units 29a, b, c, d and 30a, b, c, d and gating circuits 19 are conventional in construction. The total signal delay interval supplied by the units 29 and 30 of all terminals is less than the time spacing between successive pulses from generator 20. Thus if data is present in the last terminal 16 of the series, the data will have been gated out therefrom prior to the application of the next data gateout or sample pulse to the first terminal 11 of the series.

The data gated onto any one of the output cables 33 of a terminal is applied to one input section of an associated OR circuit 34. Another input section of that OR circuit being fed from the output of the succeeding terminal gating circuit 34. This applies for all but terminal 16 which has no OR circuit, the output cable 33 thereof feeding the one input of OR circuit 34 of terminal 14. Each OR circuit is conventional in construction and accordingly has 2 sections of 7-bit inputs which are routed to a 1 section 7-bit output. By tthis arrangement it is evident that the 7-bit data groups readout of each terminal eventually appear on a single 7-bit data bus 35 from the output of gate 34 of terminal 11. The 7-bit data groups from each terminal appear on bus 35 in a spaced time relationship corresponding to when they were read out of their related terminal. Data bus 35 extends from terminal 11 back to the central terminal and feeds in parallel five conventional AND gating or transfer circuits 36, 37, 38, 39 and 40. Also extending to each AND gating circuit 36 through 40 is an associated gating control input conductor 43 through 47, respectively which, when activated, permits the associated gating circuit to pass therethrough any data at its inputs. The output of each circuit 36 through 40 is applied to a related 7-bit storage register or receiver 49 through 53 as indicated, register 49 being adapted to store the data from terminal 11, register 50 the data from terminal 12, etc. The conductors 43 through 47 are each activated by a related stage of a gating control circuit 54 at a time synchronized with the appearance of the data from the related terminal on the common data bus 35. Thus the associated AND gating circuit is activated to store the related terminal data in the proper registers 49 through 53. The above circuitry accordingly serves to time sort the data appearing on common data bus 35 into each of the proper registers 49 through 53 as required.

The proper synchronization of time control of the gates 36 through 40 in reference to the spaced data appearing on data bus 35 is effected as follows. It will be recalled that each pulse from generator 20 as it is delayed as described and then applied through related conductor 31, 31a etc., to gate out the data from the related terminal to the bus 35 is also applied to the one input of associated OR circuit 32 as indicated. It will be noted that each OR circuit has two inputs and 1 output, one input being fed through conductors 31, 31a etc., while the other input is fed from the output of the OR circuit 32 of the succeeding terminal of the series. Thus one input of OR circuit 32 of terminal 11 is fed from the output of OR circuit 32 of terminal 12, etc. The last terminal 16 has no OR circuit but feeds the one input of the OR circuit 32 of terminal 14. With all 4 OR circuits 32 connected as shown it is evident the delayed clock generator pulses on each of the conductors 31, 32a, 31b in addition to gating out the data from each related terminal, also are funneled through the four OR circuits 32 linked to the 5 terminals so as to generate on a conductor 56 at the output of OR circuit 32 of terminal 11, a series of pulses. Each of these series of pulses is time coincident with the data readout of a particular terminal. FIG. 2*g* shows the signal waveform on conductor 56 which is referred to as a sync line and by comparing with FIGS. 2*b–f* it is evident that each pulse is time synchronized with the delayed generator pulse which effects readout of any particular terminal. Thus the first pulse of the series in FIG. 2*g* is substantially time coincident with the delayed pulse FIG. 2*b* gating out terminal 11 data to data bus 35; the second pulse is substantially time coincident with terminal 12 readout (FIG. 2*c*) etc.

The sync pulse waveform on sync line 56 is applied to the previously mentioned gate control circuit 54. The gate control circuit is a multistage stepping circuit or conventional ring of 5 stages wherein only 1 stage is active at any one time and on each input pulse the active stage is advanced by one. Thus if we assume that the ring is set with its fifth or last stage active, the first sync pulse on conductor 56 of each group of 5 such pulses (FIG. 2*g*), turns off stage 5 OFF of the ring and turns on stage 1. The active stage one is effective through conductor 43 to condition the control input of gating or transfer circuit 36 to pass therethrough any data on bus 35. The data on bus 35 which arrives coincident with stage 1 of ring 54 being ON, is the data (see FIGS. 2*b* and 2*g*) from terminal 11 and this data is accordingly routed to register 49 as desired. With the arrival of the second sync pulse of the group at ring 54, the first stage thereof is turned off and stage 2 turned on. As a result AND gating circuit 37 is conditioned to pass the data present on bus 35 from terminal 12 to its related register 50. This same action is effected for each succeeding sync pulse on line 54 to route the data on bus 35 to registers 51, 52, and 53 as required. With the advance of the ring to its fifth stage and the resulting routing of data on bus 35 (from terminal 16) to register 53, the cycle of operation effected by one pulse from generator 20 is completed. New data may then be generated at each of the remote terminals, the data being readout and routed again to the proper registers 49 through 53 under control of the next pulse generated by unit 20. Data deposited in the destination registers 49 and 53 is utilized in any desired way in the central and cleared out of each register prior to the entry of new terminal data therein.

It is thus evident from the above discussion that each pulse from generator 20 not only effects a time sequenced readout of data to bus 35 from each of the remote terminals in turn, but also through sync line 56 and gating control 54, sorts out the data on bus 35 and routes each data group to the proper destination. Since one original discrete pulse serves as the control for the entire timed operation of the system, any possibility of skew between data and decoding of the data at the central terminal 10 is eliminated. Since both the sync line 56 and bus 35 are carried in a common cable extending between the various terminals and the central terminals, any external transients affect both data and sync and prevent one from getting out of time with the other.

The system may be expanded readily by just extending the number of serially connected terminals in the same manner as shown and adding additional gating and storage registers in the central. If the number of terminals added inserts time delays exceeding space between adjacent pulses from generator 20 before all terminals could be readout, it is only necessary to decrease the frequency of the signal output from generator 20 to accommodate a larger total time period. Data deposited in the destination registers 49 and 53 is utilized in any desired way in the central and cleared out of the register prior to the entry of new terminal data therein.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data multiplexing system having a number of remote stations and a central station, apparatus to sample the data message at each remote station in time sequence for transmision over a common bus to the central and for routing each data message to a related destination in the central comprisings, in combination, a clock generator at said central for generating periodic data sample pulses, a data sample line responsive to sample pulses from said generator, said line extending to each of said remote stations in turn and including signal delay elements spaced thereupon with each remote station being tapped to said line at an individual point so that each sample pulse is applied thereto after a corresponding related time delay, a data source device at each of said remote stations, a common data bus system linked successively to each of said remote stations and then to said central and responsive to each sample pulse received at a remote station to gate data present at the associated data source device to said common data bus, a common sync control line extending successively from each of said remote stations and then to said central, signal transfer means at each remote station and responsive to each data sample pulse received to generate a corresponding sync time pulse on said sync line, and a selection circuit at said central and responsive to each pulse or said sync line to time select the data on said common bus at said central from the related remote station.

2. Apparatus as in claim 1 further characterized by the fact that said selection circuit in said central comprises a plurality of gating devices, one for each remote station, each gating device having a control input and a data input, said common bus feeding the data input of all said gating devices in parallel, and a ring circuit having one stage for each remote station each stage having an output connected to the control input of a related gating device for conditioning that device, said ring including a ring advance input fed by said sync line.

3. In the data multiplexing system having a number of data sending stations and a data receiving central station having an individual receiver for the data from each sending station, the combination comprising, a pulse generator located at said central for generating periodic data sample pulses, a common data bus extending from each of said sending stations in turn to said central, sending station data read out means including a data sample line having signal delay elements therein, said line extending from said central pulse generator to each said sending stations in turn, said read out means being responsive to each data sample pulse to data sample each sending station in turn and read out the data therefrom onto said common bus, a plurality of gating devices in said central and adapted when operable to route the data on the bus at that time to the related receiver, each gating device having a control line and a data input, said common data bus feeding the data input of each said gating devices, a gating control means at said central for activating control lines of each of said gating devices in turn in response to sync signals applied to a sync input thereof, a common sync signal line extending from each of said sending stations in turn to said sync signal input of said gating control means, and means for applying each data sample pulse as it samples the related sending station data also to said sync signal line extending to said gating control means.

4. In a time division data multiplexing system having a number of remote data sending stations for transferring data to a common central station, a data transfer control system comprising, in combination, a pulse generator located in said central for generating spaced data sample pulses, sample data pulse means driven by said generator and adapted to apply each generator pulse through delay elements to data sample each sending station in a set time sequence, common data line means extending back from each of said sending stations in turn to said central and on to which data from each remote station is dumped in response to the arrival of a data sample pulse at that station, a plurality of transfer circuits in said central, one for each of said sending stations, each transfer circuit having a control input and a data input fed from said common data line means, multistage stepping means having a stage for each sending station with only one stage being actuated at a time, said stepping means being responsive to each signal applied thereto to activate a stage following a stage which was previously activated, a control line for applying signals to said stepping circuit to advance it stage by stage, a connection from each of said stages to a related one of said transfer circuit control inputs for rendering said transfer circuit operative when the related stage is activated and sync pulse generating means at each of said sending stations and responsive to each sample pulse as it samples said related station data to generate a concurrent sync pulse on said control line to advance said stepping means.

5. A time division data multiplexing system comprising in combination, a series of remote data sending stations, a common data central station, a pulse generator located at said central station and generating spaced data sample pulses, data sample pulse line means responsive to said pulse generator and extending from said central station to each of said sending stations in turn, said sample pulse line means including signal delay elements wherein each sample pulse as it travels down said pulse line means is applied to each remote station in turn at a specific and spaced delay interval, the time for a sample pulse to travel to the last terminal of the line being less than the repetition rate of said pulse generator, a common data bus extending from said remote stations to said central station, data source means associated with each remote station for generating signal indications of the data to be sent therefrom to said receiving station, gating means associated with each remote station for gating the data signal indications from the related data source to said common data bus, each gating means including a control responsive to each sample pulse when it arrives at said remote station for activating that gating means, common sync pulse means having an OR gate at each remote station and having one input fed by each sample pulse applied to that station and having another input fed by the output of the OR gate of the next further station, in said series of stations said sync means including a connection from the OR gate output of the first remote station of said series of such stations to said central wherein each data sample pulse as it gates out the data of the associated remote station to said common data bus also generates a corresponding sync pulse for transmittal to said central, a plurality of data registering devices at said central station, one for each remote station, for receiving the data from the corresponding station, individual register gating means at said central station, one for each of said registering device, each including a data input linked to said common data bus and a control responsive to a signal thereon for gating the data or its related data input to the related register, and a sequential timing device at said receiving station driven by sync pulses from said common sync pulse means for activating each of the controls of the individual register gating means in synchronism with the presence of data on the associated data inputs to accordingly route data from each remote station to its proper central station register.

References Cited by the Examiner

UNITED STATES PATENTS

| | | | |
|---|---|---|---|
| 2,504,999 | 4/50 | McWhirter et al. | 340—147 |
| 2,680,240 | 6/54 | Greenfield | 340—150 |
| 2,794,179 | 5/57 | Sibley | 340—163 |
| 2,813,927 | 11/57 | Johnson | 340—174.1 |
| 2,845,613 | 7/58 | Pawley | 340—183 |
| 2,932,006 | 4/60 | Glauberman | 340—167 |
| 2,946,044 | 7/60 | Bolgiano et al. | 340—150 |

FOREIGN PATENTS

| | | |
|---|---|---|
| 128,537 | 7/48 | Australia. |

NEIL C. READ, *Primary Examiner.*

STEPHEN W. CAPELLI, *Examiner.*